United States Patent
Shin et al.

(10) Patent No.: US 11,879,744 B2
(45) Date of Patent: Jan. 23, 2024

(54) INFERRING LEFT-TURN INFORMATION FROM MOBILE CROWDSENSING

(71) Applicant: THE REGENTS OF THE UNIVERSITY OF MICHIGAN, Ann Arbor, MI (US)

(72) Inventors: Kang G. Shin, Ann Arbor, MI (US); Dongyao Chen, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 595 days.

(21) Appl. No.: 17/012,176

(22) Filed: Sep. 4, 2020

(65) Prior Publication Data

US 2021/0072039 A1 Mar. 11, 2021

Related U.S. Application Data

(60) Provisional application No. 62/896,926, filed on Sep. 6, 2019.

(51) Int. Cl.
| | |
|---|---|
| *G01C 21/00* | (2006.01) |
| *G01C 21/34* | (2006.01) |
| *G01S 19/42* | (2010.01) |
| *G06F 16/25* | (2019.01) |

(Continued)

(52) U.S. Cl.
CPC ......... *G01C 21/3492* (2013.01); *G01C 19/00* (2013.01); *G01S 19/42* (2013.01); *G06F 16/258* (2019.01); *G06N 3/08* (2013.01)

(58) Field of Classification Search
CPC ............... G01C 21/3492; G01C 19/00; G06F 16/258; G01S 19/42; G06N 3/08
See application file for complete search history.

(56) References Cited

U.S. PATENT DOCUMENTS

| | | | |
|---|---|---|---|
| 9,834,222 B2 | 12/2017 | Shin et al. | |
| 2009/0205936 A1* | 8/2009 | Ueno | H01H 3/16 200/61.28 |
| 2016/0318523 A1* | 11/2016 | Kim | B60W 50/082 |

(Continued)

FOREIGN PATENT DOCUMENTS

KR    10-2014-0088640 A    7/2014

OTHER PUBLICATIONS

Xinhua Liu, "A Vehicle Steering Recognition System Based on Low-Cost Smartphone Sensors", 2017 (Year: 2017).*

(Continued)

*Primary Examiner* — Elaine Gort
*Assistant Examiner* — Brittany Renee Peko
(74) *Attorney, Agent, or Firm* — Harness, Dickey & Pierce, P.L.C.

(57) ABSTRACT

Left turns are known to be one of the most dangerous driving maneuvers. An effective way to mitigate this safety risk is to install a left-turn enforcement—for example, a protected left-turn signal or all-way stop signs—at every turn that preserves a traffic phase exclusively for left turns. Although this protection scheme can significantly increase the driving safety, information on whether or not a road segment (e.g., intersection) has such a setting is not yet available to the public and navigation systems. This disclosure presents a system that exploits mobile crowdsensing and deep learning to classify the protection settings of left turns.

17 Claims, 12 Drawing Sheets

(51) Int. Cl.
  *G06N 3/08*     (2023.01)
  *G01C 19/00*    (2013.01)

(56) References Cited

U.S. PATENT DOCUMENTS

| | | |
|---|---|---|
| 2017/0113665 A1 | 4/2017 | Mudalige et al. |
| 2018/0122155 A1 | 5/2018 | Barreira Avegliano et al. |
| 2018/0129209 A1 | 5/2018 | Chen et al. |
| 2018/0315313 A1 | 11/2018 | Klochikhin et al. |
| 2019/0102840 A1 | 4/2019 | Perl et al. |
| 2019/0232974 A1* | 8/2019 | Reiley ............... B60W 50/085 |
| 2020/0193736 A1* | 6/2020 | Lawrence ............ G07C 5/085 |
| 2020/0348137 A1* | 11/2020 | Jain .................. G01C 21/165 |

OTHER PUBLICATIONS

Minh Van Ly, "Driver Classification and Driving Style Recognition using Intertial Sensors", 2013 (Year: 2013).*

Dang-Nhac Lu, "Vehicle Mode and Driving Activity Detection Based on Analyzing Sensor Data of Smartphones", 2018 (Year: 2018).*

* cited by examiner

| Category | Category | Recall | F-1 |
| --- | --- | --- | --- |
| Protected | 0.90 | 0.86 | 0.88 |
| Unprotected | 0.91 | 0.93 | 0.92 |
| Average | 0.90 | 0.90 | 0.90 |

INFERRING LEFT-TURN INFORMATION FROM MOBILE CROWDSENSING

CROSS-REFERENCE TO RELATED APPLICATIONS

This application claims the benefit of U.S. Provisional Application No. 62/896,926, filed on Sep. 6, 2019. The entire disclosure of the above application is incorporated herein by reference.

FIELD

The present disclosure relates to techniques for inferring left turn information from mobile crowdsensing.

BACKGROUND

Left turns are one of the most dangerous driving maneuvers that account for a large percentage of fatal traffic accidents. For example, among the different driving maneuvers at intersections, left-turns are reported to be the deadliest due to oncoming (interrupting) traffic and pedestrians crossing the street the car is turning onto. According to a survey report by the U.S. Department of Transportation, left-turns-related accidents alone constitute 53% of all intersection-related crashes in the U.S. In fact, to mitigate left-turns-related accidents, some companies like UPS are enforcing their delivery trucks to avoid, if possible, all left turns.

There have been extensive transportation engineering efforts to enhance the safety of left turns by deploying different left-turn regulations at intersections with high-frequency left turns. In general, these regulations can be categorized as protected and unprotected settings.

At a protected left-turn, when the left-turn signal is turned on, only left-turning vehicles are permitted. This is the most effective way to avoid/reduce left-turn-related accidents. According to the NHTSA report, an intersection that has a protected left-turn signal can effectively reduce the left-turns-related accidents by 87%, making the intersection safer for all traffic. Based on the traffic regulation, a left turn protection (e.g., a green leftward arrow in the U.S.) reserves a traffic phase—a time period assigned to certain traffic movements—exclusively for left turns.

At an unprotected left-turn, when vehicles are permitted to make left turns, it is the drivers' responsibility to stay alert and avoid interrupting traffic and/or pedestrians. For example, circular traffic lights (i.e., traffic lights that only show round-shaped light colors) and stop signs provide less restrictive protection by halting the crossing traffic (i.e., perpendicular to the ego-vehicle's initial heading). Drivers of left-turning vehicles have to be extremely careful of, and avoid interrupting traffic/pedestrians from all possible directions.

The information of left-turn settings is essential for drivers to enhance safety by using it before making dangerous left turns; for example, drivers can choose to avoid less-protected left turns when planning a trip route with Google maps.

Unfortunately, such information is not yet available to the public/drivers for two reasons. Although traffic signals and signs are installed by the local transportation department, the corresponding specification is fragmented or not even digitized due to the diverse development levels for different regions. For example, Waze's left-turn avoidance function is available only in major cities of California.

Second, information of traffic lights/signs can be extracted from the images of intersections captured by a limited number of heavily instrumented road survey vehicles (e.g., mapping cars for Google StreetView). However, updating the road information is hampered by the prohibitive road-survey cost. As a result, updating the database of on-road images may take years even in well-developed regions. These limitations prevent a large coverage of road survey services and timely reflection of changes of traffic lights/signs.

To narrow this gap and evaluate left-turns safety by discovering and sharing the left-turn setting information on road segments (e.g., intersections), a system has been developed that can effectively differentiate protected/unprotected left turns by using the crowdsensed data (i.e., gyroscope, accelerometer, and GPS data) collected from mobile devices carried by drivers and passengers. This system is referred to herein as the TurnsMap system.

This section provides background information related to the present disclosure which is not necessarily prior art.

SUMMARY

This section provides a general summary of the disclosure, and is not a comprehensive disclosure of its full scope or all of its features.

In one aspect, a method is presented for classifying left turns of a vehicle. The method include: receiving a sensor signal from a sensor residing in the mobile device while the vehicle is moving, where the signal is indicative of angular speed of the vehicle; identifying one or more bumps in the sensor signal; and classifying a left turn made by the vehicle as being a protected left turn based on number of bumps identified in the sensor signal, where the protected left turn has a traffic indicia which causes a time period assigned exclusively to making a left turn. In one embodiment, a left turn made by the vehicle is classified as being a protected left turn in response to identifying one bump in the sensor signal and classified as being an unprotected left turn in response to identifying two bumps in the sensor signal.

In some embodiments, data indicative of left turn is extracted from the sensor data collected while the vehicle is moving.

To handle different phone postures, the method may further include converting the sensor signal from a coordinate system associated with the mobile phone to a geographic coordinate system, where the sensor signal is report by the sensor relative to the coordinate system associated with the mobile phone; and deriving, by the processor, an angular speed signal from the converted sensor signal, where the angular speed signal is indicative of angular speed of the vehicle about a vertical axis of the geographic coordinate system.

Because one bump may not contain a complete left turn since the turn can be interrupted, the geolocation of neighboring bumps is analyzed. Specifically, the method includes: receiving geolocation of the mobile device (e.g., from GPS); associating geolocation with data points of the sensor signal, where the sensor signal is expressed as a time series; and determining two bumps in the sensor signal to be part of the same left turn based on proximity of geolocation of the two bumps to each other.

In another aspect, mobile crowdsensing and machine learning are used to classify the protection settings of left turns. The method includes: receiving a plurality of feature vectors, where each feature vector is indicative of a left turn made by a vehicle and each feature vector includes geolocation of the vehicle during the left turn and time series data for the angular speed of the vehicle during the left turn; spatially clustering the plurality of feature vectors based on geolocation to form one or more clusters of feature vectors; assigning a ground truth to the one or more clusters; and training a classifier with feature vectors in the one or more clusters using supervised learning, where the classifier outputs a probability that a left turn made by a vehicle is a protected left turn and a protected left turn has traffic indicia which creates a time period assigned exclusively to making a left turn.

To enhance training, time series data from the feature vectors belong to a given cluster are concatenated to form training data for the classifier, and then the sequence of time series data from the feature vectors belong to the given cluster is randomly permutating to form additional training data.

In one embodiment, the feature vectors are spatially clustered using a density-based spatial clustering of applications with noise method.

In some embodiments, the classifier is further defined as a recurrent neural network.

Once a classifier has been trained, it can be used to classify left turns. The classified turn can then be used to select a route for a vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
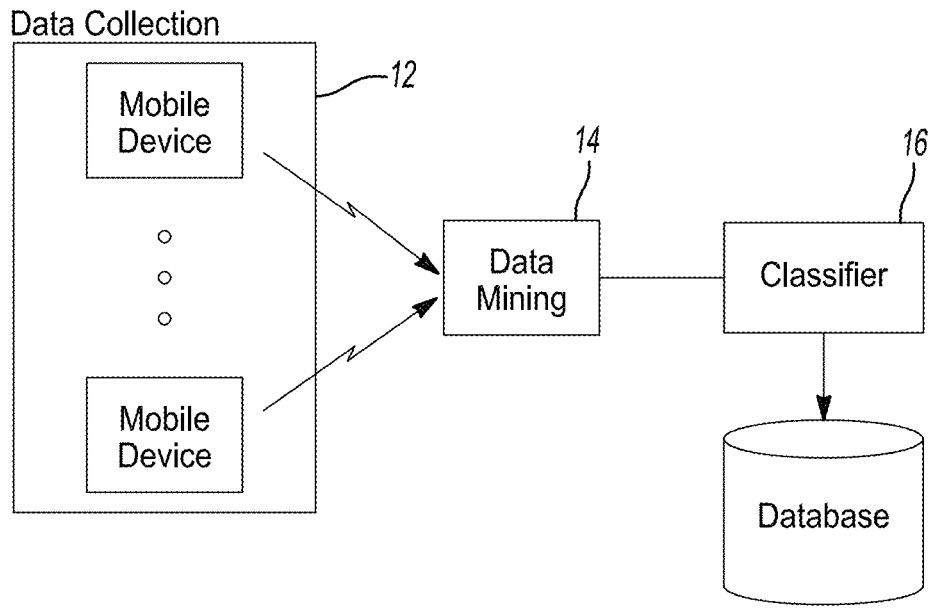
FIG. 1 is a diagram of the proposed TurnsMap system.

Example embodiments will now be described more fully with reference to the accompanying drawings.

The protected left-turn setting is the most effective way to mitigate the safety risk at intersections. However, it is not feasible or even desirable to install the protection at every left-turn hotspot, because strict protection of left turns degrades the overall traffic throughput. For example, since a protected left-turn signal only allows left-turning vehicles to go through the intersection, NHTSA suggests such a signal to be installed only at those intersections where all intersecting roads have a similar traffic volume. Since drivers (especially novice drivers with limited driving experience) may choose only protected turn lefts, the information of protection settings of left turns, if publicly available, will help them and automotive apps to enhance safety.

It follows that planning a route with a minimum number of high-risk (i.e., un-/less-protected) left turns in navigation systems (e.g., Google maps, Waze) by utilizing left-turns enforcement information would be highly desirable. Let one consider a typical usage scenario. If the user enables this functionality on his/her navigation app, then it can exploit the left-turns information on all possible routes to generate the route with the least number of risky left-turns while ensuring an acceptable estimated arrival time (ETA) at the destination. Note that by providing its users with safer travel paths, a navigation app can also efficiently collect data from its users to help expand/update the TurnsMap system, achieving a win-win collaboration between the app and its users.

Additionally, as highlighted by self-driving car companies (e.g., Waymo and Zoox), handling unprotected left turns is a challenging task for this rapidly emerging technology since it requires not only human-level driving skills but also even psychological understanding. For example, some pedestrians may let left-turning cars go first, while others may ignore or fail to see left-turning cars and cross the street without paying attention to the approaching cars and pedestrians. In such a case, both human drivers and pedestrians could use a body language or even eye contact to resolve this conflict, but it is very challenging for autonomous cars to understand and resolve this type of conflict.

Hence, autonomous cars can avoid such intersections by using the TurnsMap system to enhance safety for both cars and pedestrians by selecting paths with a minimum number of unprotected left turns in the path planning process.

The TurnsMap system outsources the data collection task to the crowd and only processes the IMU sensor data, thus can enable a much larger coverage and faster update-rate than the existing road-survey (e.g., mapping cars of Google Street View) and camera-based approaches, which collect road images by using cameras on either dedicated mapping car or users' smartphones. Specifically, the performance of understanding traffic scenes (i.e., classifying left-turn enforcements) from image data—one of the most common data sources for legacy scene perception tasks, could be hampered by both diverse real-world settings and limited resources, such as poor visibility of traffic signals and signs, limited coverage and the high cost/overhead of collecting road image from smartphones.

The visibility of traffic signals/signs may be distorted due to the weather, lighting condition and even local regulations. Moreover, the location of traffic lights/signs may be different in different regions—they could be located at the middle of an intersection or above a waiting line (e.g., in European countries). In fact, determining a region-of-interest (ROI) based on computer vision is still a challenging open problem. The complexity of accounting for real-world environments makes it even harder for a computer vision task to function correctly on a large and diverse image dataset.

Due to the different level of development, a vast majority of regions in the world cannot be covered by dedicated road survey services. For example, as of 2017, only a small number of areas are fully covered by Google StreetView. In fact, many countries and regions in Asia and Africa are not yet covered, nor planned to be covered in the near future.

Processing image data requires high computational power and is thus expensive to run locally on the user's smartphone. Even if the developer chooses to upload the image(s) to the cloud service for processing, transmission of the bulky image and/or video data may exhaust mobile network bandwidth. Moreover, to have a clear view of an intersection, the user has to fix the phone on the windshield, which is a stringent and often undesirable requirement for various use-cases.

FIG. 1 provides an overview of a proposed TurnsMap system 10. The TurnsMap system 10 is comprised of three key building blocks: a data collection component 12, a data mining component 14 and a classifier 16. The data collection component 12 collects sensor data from users. In one example, the data collection components is one or more mobile devices, where the mobile devices capture sensor data while the user is in a moving vehicle. The sensor data from multiple users is preferably accumulated at a server.

The data mining component 14 analyzes the sensor data and extracts data which occurred while a vehicle made a left turn. To classify the left turns as being one of a protected left turn or an unprotected left turn, a classifier 16 and associated machine learning pipeline is used. In an example implementation, the data mining component 14 and the classifier 16 reside on a server. Once the classifier 16 has been trained, it can be used to classify intersections and other geolocations having a high concentration of left hand turns. These classifications are stored in a database for subsequent use, for example to assist with vehicle navigation.

In one embodiment, a software application (i.e., app) residing on a mobile device, such as a mobile phone or the like, is used to collect real-world driving data. There are three key rationales behind the design of the mobile app for collecting the natural driving data. First, different phone postures (e.g., sitting on a phone mount or cupholder) can affect the IMU sensor readings. For example, if the smartphone's screen is facing down, its yaw axis angular speed will be the inverse of the readings with the screen facing up. Second, since smartphones have limited resources (e.g., CPU, battery, and cellular network bandwidth), the data collection should incur low overhead on the users' devices—a high overhead will likely discourage the users in adopting and/or contributing to the TurnsMap system. Third, a comprehensive database should cover heterogeneous intersection setups, i.e., the dataset should cover different drivers since different driving habits may incur diverse driving maneuvers at left turns. This is an essential requirement for building a comprehensive classifier that is resilient to the changing environment and users.

Figure 2:
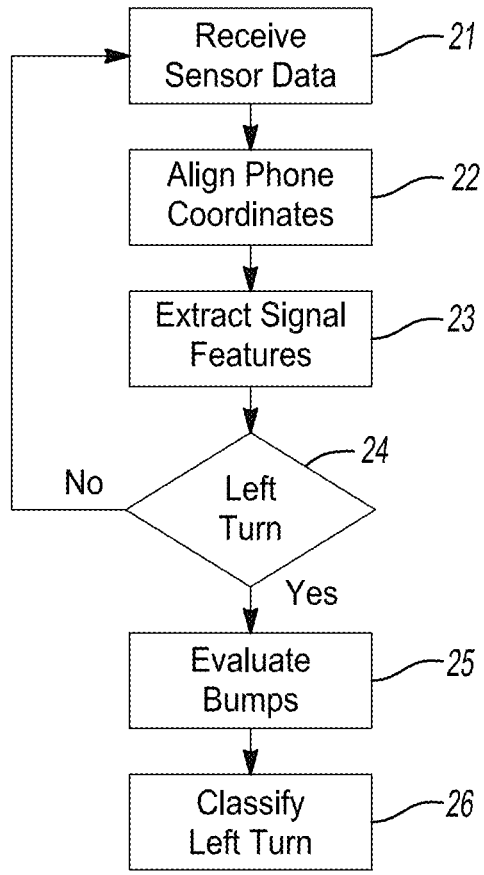
FIG. 2 is a flowchart depicting an example embodiment for a data collection app used in the TurnsMap system.

FIG. 2 depicts an example embodiment for a data collection app. The data collection app receives at 21 a sensor signal from a sensor residing in the mobile device while the vehicle is moving. The signal is indicative of angular speed of the vehicle. In the example embodiment, the sensor is further defined as a gyroscope although other types of sensors are contemplated by this disclosure. Additionally, the data collection app receives geolocation for the mobile device, for example in the form of readings from a global positioning system (GPS) residing in the mobile device. The data collection app may also receive input from other types of sensors (e.g., an accelerometer) as well.

Figure 3:
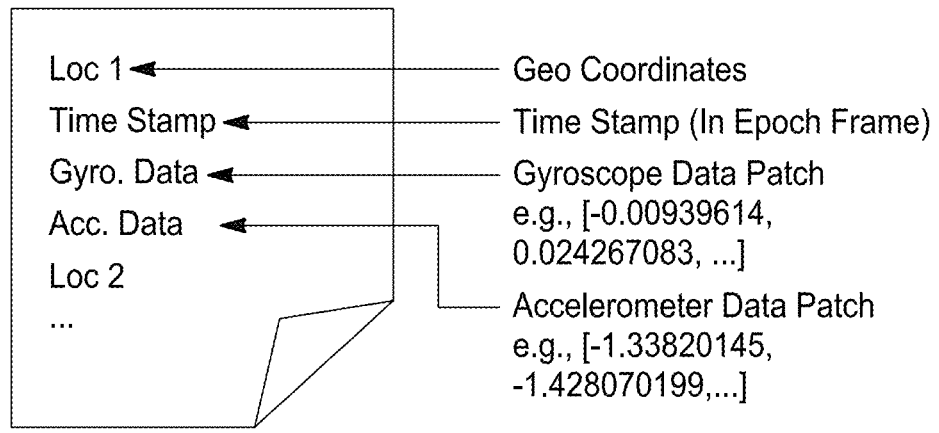
FIG. 3 illustrates an example data format for data collected by the data collection app.

Lowering the overhead on the user's smartphone is one key objective of the data collection app. In the example embodiment, the data collection app samples the thus-aligned IMU sensor data and GPS (i.e., (longitude, latitude) pair) data at 100 Hz and 1 Hz, respectively. An example data format for the collected data is shown in FIG. 3. The data format is comprised of coordinates for a geolocation, a timestamp, a gyroscope data vector, and an accelerometer data vector, where each vector consists of 100 data samples. Because of the light-weight feature of IMU and GPS data, the collection process incurs low overhead on users' mobile devices. For example, data collection by the example embodiment is shown to generate only 6.2 MB data per hour. To enhance the flexibility of using their data plan, the participants can choose to upload the data in real time, or when a free Wi-Fi connection is available. Finally, the data collection app is shown to incur only marginal CPU and energy overheads.

For proof of concept, 18 drivers (14 males and 4 females of age ranging from 23 to 70) were recruited and the data collection app was installed on their smartphones. The participants were students, university professors, and company employees. Ten different car models were used, including coupe, sedan, SUV, and sporty cars. To collect natural driving data, no restriction was imposed on driving route, vehicle type, smartphone model and location, etc. That is, the participants were told to drive their own cars for daily commute as normally as possible.

Figure 4:
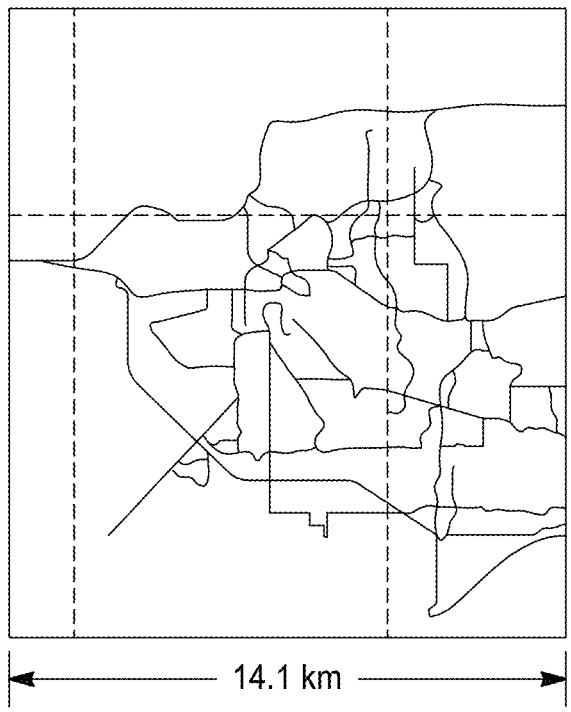
FIG. 4 depicts a suburban area where driving data was collected.
Figure 5:
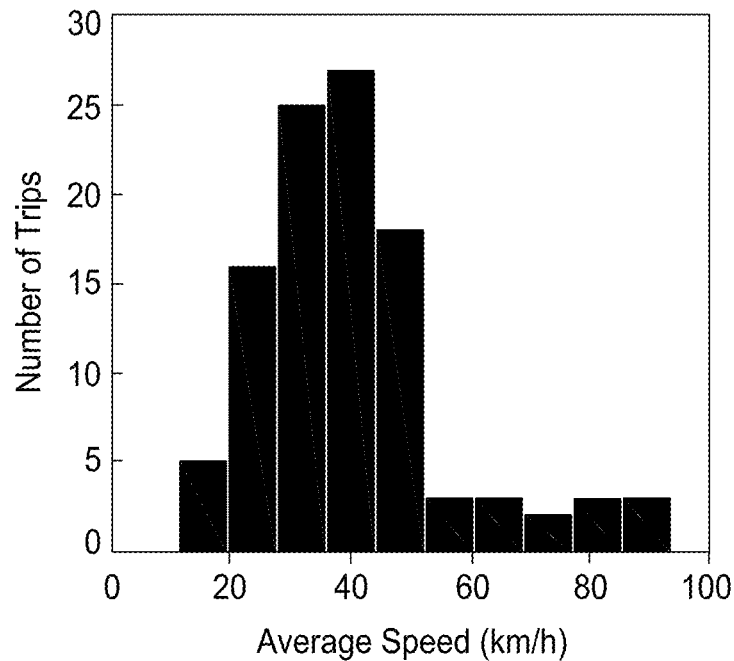
FIG. 5 is a histogram showing the average driving velocity for the collected driving data.

The data collection app collected data in a region that includes both urban and suburban environments in Ann Arbor and in the Detroit metropolitan area of the U.S. The data-collection process yielded 1.6 GB mobile IMU data, covering an area of approximately 300 $km^2$, with the accumulated travel distance of more than 3,589 km. The data collection was conducted between 7:30 am to 6:30 pm. FIG. 4 shows a suburban area of driving data collected, where the red traces are the driving trajectories. The dataset includes 105 trips contributed by all participants, with the accumulated driving time 78.3 hours. The histogram of the average driving velocity is shown in FIG. 5. The majority of the trips has average speed between 20-45 km/h, reflect the normal average driving speed in cities. There are a few trips have high averaged speeds, e.g., exceed 80 km/h. These trips were collected from driving on highways.

To handle different phone postures inside a car and achieve consistency in data analytics, the data collection app aligns the phone coordinate with the earth coordinate as indicated at 22. That is, the sensor signal is converted from a coordinate system associated with the mobile phone to a geographic coordinate system, where the sensor signal is reported by the sensor relative to the coordinate system associated with the mobile phone. Techniques for transforming the data are readily known in the art. One example technique is further described by Dongyao Chen et al in "Invisible sensing of vehicle steering with smartphones" In Proceedings of the 13th Annual International Conference on Mobile Systems, Applications, and Services, MobiSys '15, 2015 which is incorporated herein by reference. This capability enhances the systems usability by eliminating the restriction of the device's posture, i.e., a phone can be placed at any stable position, such as on a cupholder/phone mount, inside the car.

The TurnsMap system 10 infers left-turn protection settings by using the mobile sensor data. To infer the type of left turn, one needs to answer the following questions. How to differentiate intersection settings by using the mobile sensory data and how to organize the crowdsourced data for this purpose? To answer the first question, one can elaborate how IMU sensor readings can capture the interruptions between left-turning cars and the crossing traffic and/or pedestrians. These interruptions are then used to differentiate left turn setups. To answer the second question, one can use data mining to extract and cluster the left-turn data snippets to discover left-turn hotspots, i.e., road segments with many left turns. Note that a hotspot could be an intersection and even an entrance of a popular plaza. These answers are essential for constructing a comprehensive dataset of left turns for the subsequent machine learning.

The key for distinguishing protected and unprotected left turns is the fact that left turns are likely to be interrupted on road segments without strict left-turn enforcements, such as left-turn signals or stop signs. Based on this observation, this disclosure uncovers the root causes of interruptions which are identified by utilizing phone IMU sensor data. The root causes of these interruptions are (i) the enforcement-free intersection setup to increase the traffic throughput and (ii) pedestrians crossing the street the car is left-turning to. Due to the low priority given to left-turning cars, drivers need to pay full attention to any sudden situation change and prepare to pause and/or yield to the oncoming traffic and pedestrians crossing the street they are turning onto.

Figure 6:
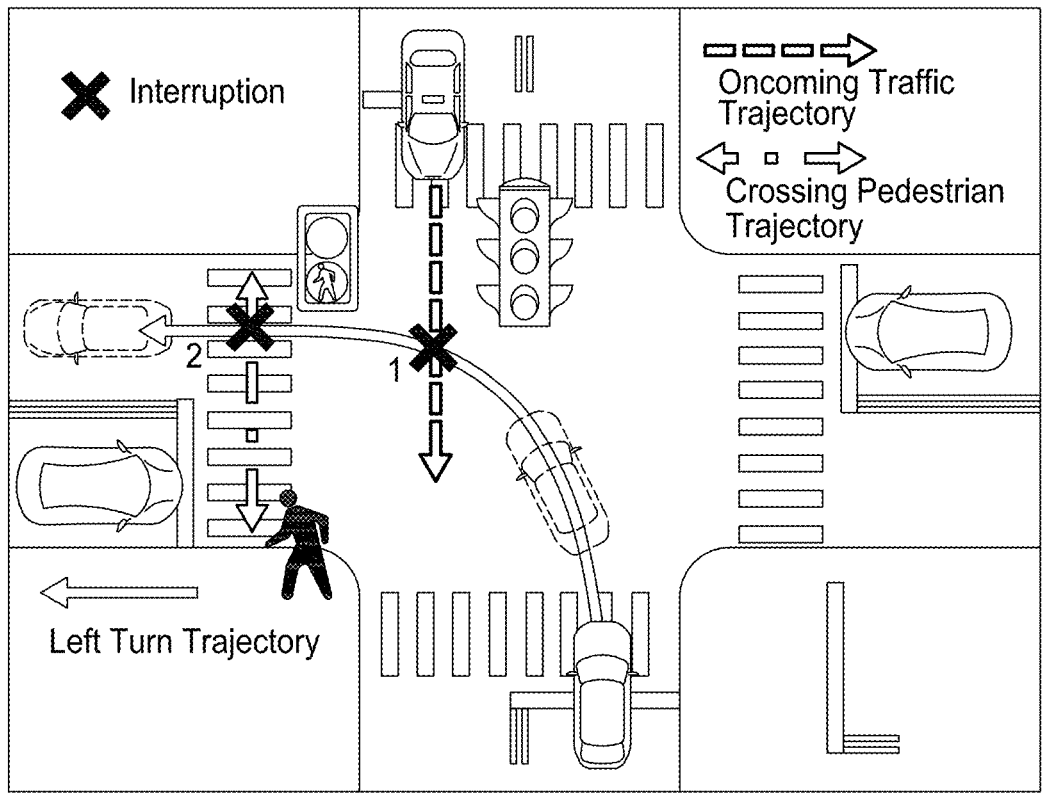
FIG. 6 is a diagram showing possible interruptions that a car may experience while turning left at an intersection with an unprotected left turn.

FIG. 6 shows possible interruptions that a car may experience while turning left at an intersection with a unprotected enforcement (i.e., circular traffic light). The most common (as stated in the driver manual) left-turn maneuver works as follows. A left-turning car first enters the intersection after the green light comes on and then suspends its turn if there is an oncoming car from the opposite direction. Upon resuming the left turn, the car needs to pay attention to, and prepare to pause for, pedestrians crossing the street/road it is turning onto. Finally, the left-turning car completes the turn by exiting the intersection.

Similar interruptions also occur at the intersections with stop signs. After making a full stop at the sign, the left-turning car needs to proceed until the driver can see the approaching traffic. In summary, interruptions are likely to happen while making unprotected left turns at intersections.

In contrast, interruptions occur rarely at intersections with protected enforcements, because the protected traffic signal (i.e., the left-turn traffic arrow) grants left-turning cars an exclusive traffic phase, hence preventing pedestrians and oncoming vehicles from crossing the intersection. In fact, as stated in the NHTSA intersection engineering handbook, one of the main purposes of enforcing left-turns protection is to reduce the left-turning cars' conflicts with the oncoming traffic and crossing pedestrians.

In an example embodiment, the TurnsMap system 10 uses angular speed data (e.g., from a gyroscope) to detect the interruptions. Since an interruption is essentially a pause of steering maneuver, the coordinate-aligned gyroscope data (i.e., angular speed) can capture the differences between normal and interrupted left-turns. While reference is made to angular velocity of the vehicle in this disclosure, it is readily understood that metrics related to the motion of the vehicle can also be used to detect interruptions made during left turns.

Figure 7A:
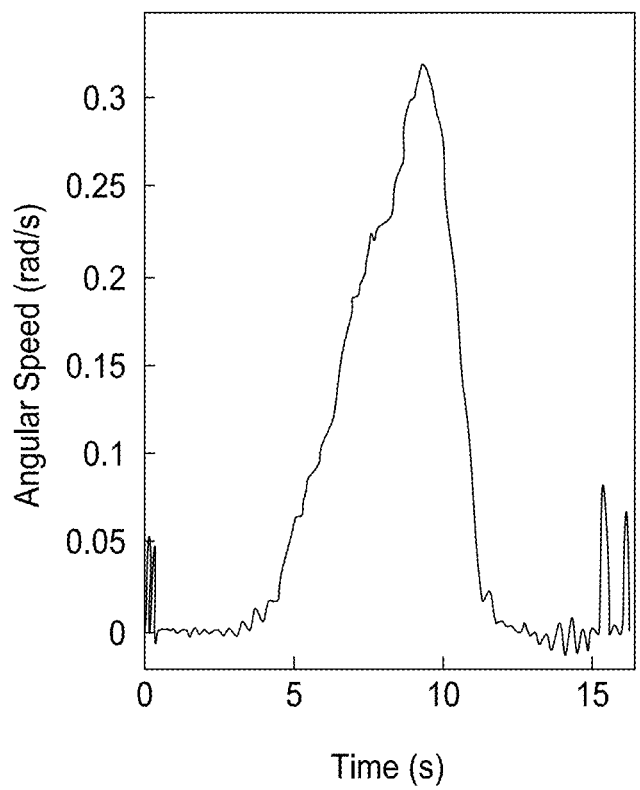
FIG. 7A is a graph showing the gyroscope readings during an uninterrupted left turn.
Figure 7B:
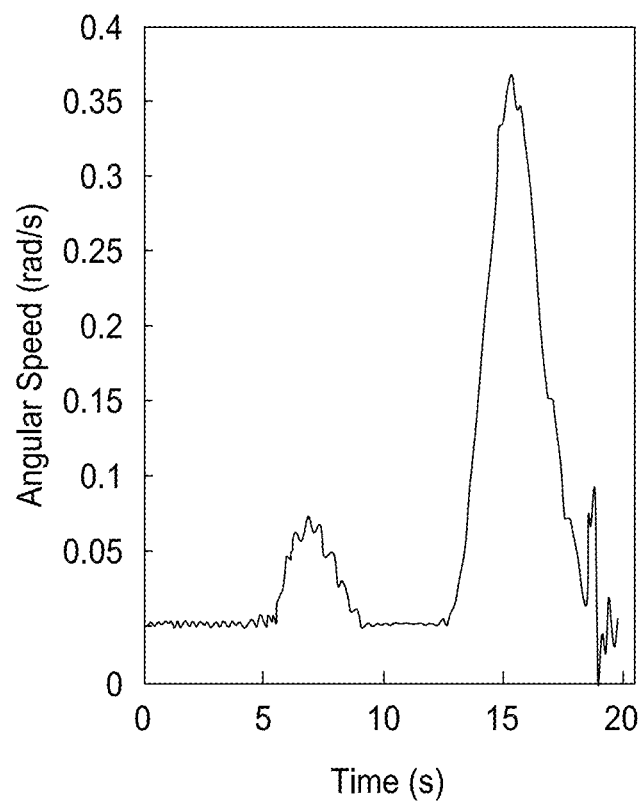
FIG. 7B is a graph showing the gyroscope readings during a left turn with an interruption at the middle of an intersection.
Figure 7C:
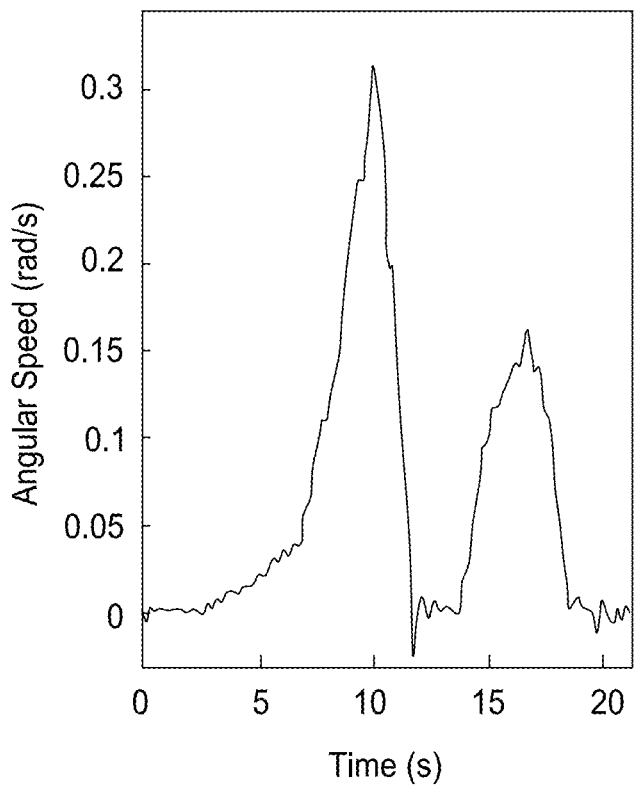
FIG. 7C is a graph showing the gyroscope readings during a left turn with an interruption at the crosswalk.

FIGS. 7A-7C show the gyroscope readings of three scenarios: no interruption, interruption at the middle of an intersection (interruption 1 in FIG. 6), and a left turn with an interruption at the crosswalk (interruption 2 in FIG. 6), respectively. When a car makes a left turn, the gyroscope reading captures the car's angular speed (w). When the driver makes a (normal) left turn without interruption, s/he first turns the steering wheel counter-clockwise, creating a monotonic increase of the vehicle's angular speed w as seen in FIG. 7A. The driver then makes a clockwise turn of steering wheel until the car's orientation returns to straight, or w returns to approximately 0. Hence, a smooth left turn generates a single bump in the gyroscope reading.

When an interruption occurs, the rise of w stops and returns to 0, thus creating the first bump in the gyroscope reading; after the driver resumes the left turn, w will first rise and then drop until the driver exits the intersection, creating the second bump in the gyroscope reading. FIGS. 7B and 7C show this unique pattern of the gyroscope reading. These observations are the cornerstone of the TurnsMap system, showing that IMU data collected during each left-turn contains information useful to capture the left-turn enforcement information. While reference is made through this disclosure to angular velocity, it is readily understood the other motion metrics may be analyzed for interruptions.

The size of the crowdsourced time-series data can be massive, and some portions of the data may be redundant and not useful for the system, i.e., driving on straight roads or making right turns. Hence, it is necessary to extract data snippets that contain the targeted driving maneuver (i.e., left turn).

To achieve this goal, the system preferably extracts signal features indicative of left turns (e.g., bumps) from the IMU and GPS sensor data of the driver's smartphone as indicated at 23 of FIG. 2. Although not limited thereto, an example technique for detecting left turns from the sensor data is further described below. The example technique detects vehicle steering maneuvers by harvesting the morphological patterns of the sequential gyroscope data. For example, the technique analyzes the gyroscope data to detect the start and end points of a "bump"-shaped curve by using a predetermined threshold derived from the common driving behavior. To validate if the current bump is incurred by a driving maneuver or noise (e.g., system glitch), the technique examines the statistical features (e.g., duration, magnitude) of the bump. This technique may also handle false detections. Specifically, since some vehicle movements (e.g., driving on a curvy road, or up/down hill) may also regard a bump-shaped curve as a turning maneuver. To detect these false detections, this technique calculates the moving vehicle's displacement and uses it to validate the detection result. By performing the above steps, a turning maneuver can be detected with linear time complexity. Further details regarding this technique may be found in U.S. Pat. No. 9,834,222 entitled "Detecting Vehicle Maneuvers with Mobiles Phones" which is incorporated by reference herein. Other techniques for detecting left turns also fall within the scope of this disclosure.

However, the TurnsMap system 10 faces a unique challenge—one bump may not contain a complete left turn since the turn can be interrupted (e.g., by crossing pedestrian/cars), thus generating two or more bumps in a left turn. To overcome this challenge and accurately crop the sensor data trace that contains a complete left turn, one can examine whether or not the neighboring bumps are geo-located adjacently. Specifically, if neighboring bumps on the same IMU trace are adjacent in geo-distance, i.e., great-circle distance between two points on the surface of the earth, then they together represent a single left-turn maneuver. Upon detecting a bump, whether the bump represents a complete left turn is not yet determined. To determine if the pending bump's geolocation is close to the neighboring bump(s), one check if the geo-distance between the centroids of geolocations of those bumps (let $loc_{cur}$ and $loc_{pend}$ denote the centroid of the geolocation of the current bump and the pending bump, respectively) is within a threshold $\theta_{geo}$. The centroid is derived by using FindCentroid(•), which is the mean of latitude and longitude readings. Note that this averaging step can also mitigate the fluctuation of GPS readings. In one example, the geo-distance is calculated by using the haversine formula. Thus, if the current and pending bumps are from the same left turn, the current bump is merged with the pending bump(s). Otherwise, the current bump is a complete left turn. Finally, the start and end timestamps (i.e., $t_{cur,start}$, and $t_{cur,end}$) of the current bump can be used for cropping the left-turn data snippets from all necessary time-series data traces—gyroscope, accelerometer, and geolocation data. This example technique is summarized in the algorithm set forth below.

---

Algorithm 1 Left-turn detection algorithm of TurnsMap

Input gyroscope ($\Omega$), accelerometer ($\Phi$), and location ($\Gamma$) data traces
for w in $\Omega$ do
    Detect a valid bump based on VSense algorithm
    Find the timestamp range of the current bump [$t_{cur,start}$, $t_{cur,end}$]
    $loc_{cur}$ = FindCentroid ($\Gamma_{tcur,start}^{tcur,end}$). Here, ($\Gamma_{tcur,start}^{tcur,end}$)is
    the cropped location data trace
    based on timestamp
    if Haversine $loc_{cur}$, $loc_{pend} \geq \theta_{geo}$ then
        /*Update the bump information*/
        $t_{cur,start} = t_{pend,start}$
        $loc_{cur}$ = FindCentroid ($\Gamma_{tcur,start}^{tcur,end}$)
    else
        /*RANGE [$t_{curi,start}$, $t_{cur,end}$] includes a complete left turn*/
        Extract IMU and location data snippets (i.e., gyro, acc, and loc) respectively.
        Calculate the centroid of this left turn: $c_k$ = Find Centroid (loc)
    end if
    Update the timestamp range: $t_{pend,start} = t_{cur,start}$, $t_{pend,end} = t_{cur,end}$, $loc_{pend} = loc_{cur}$
end for

---

To organize the thus-extracted heterogeneous data (e.g., IMU sensor and geolocation traces), for each left-turn maneuver, the data is stored as a tuple called left-turn tuple l:

$$l_k = \{c_k, gyro_k, acc_k, loc_k\},$$

$$L = \{l_1, \ldots, l_k, \ldots, l_K\} \quad (1)$$

where $k \in \{1, \ldots, K\}$, K is the total number of left turns extracted by Algorithm 1; $c_k$ is the centroid of the k-th left turn; gyro and acc are IMU sensor vectors cropped from IMU sensor traces; and loc is the geo-location data trace. L is the list that stores all left-turn tuples.

Lastly, a left turn made by the vehicle is classified at 26 as being a protected left turn based on number of bumps identified in the sensor signal, where the protected left turn has a traffic indicia which causes a time period assigned exclusively to making a left turn. More specifically, a left turn is classified as being a protected left turn in response to identifying one bump in the sensor signal; whereas, a left turn is classified as being an unprotected left turn in response to identifying two bumps in the sensor signal. It is to be understood that only the relevant steps of the data collection app are discussed in relation to FIG. 1, but that other software-implemented instructions may be needed to control and manage the overall operation of the data collection app.

Figure 8:
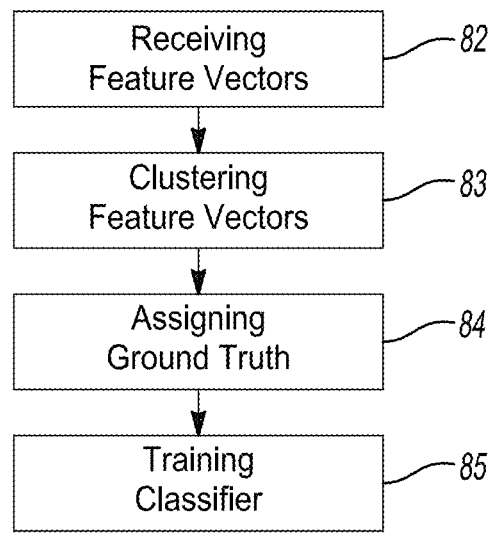
FIG. 8 is a flowchart depicting a method for classifying left turns made by a vehicle.

To improve accuracy, left turns are preferably classified using crowdsensing and machine learning as described in relation to FIG. 8. A plurality of feature vectors are received at 82, for example by the data mining component 14 of the TurnsMap system 10. The feature vectors in the plurality of feature vectors are indicative of a left turn made by a vehicle and may have been collected by the data collection component 12. Each feature vector includes geolocation of the vehicle during the left turn and time series data for the angular speed of the vehicle during the left turn.

The plurality of feature vectors are spatially clustered at 83 based on geolocation to form one or more clusters of feature vectors. In an example embodiment, the feature vectors are clustered using a density-based spatial clustering of applications with noise method (DBSCAN) although other clustering methods are contemplated by this disclosure. DBSCAN is a density-based algorithm that does not require a pre-defined number of clusters and is proven to perform well in clustering spatial data. In the example embodiment, DBSCAN (•) uses the centroid of each left-turn instance as the clustering criterion. The output (i.e., C) of DBSCAN (•) is a collection of clusters, which is comprised of left-turn tuples (ls). Only those clusters with "enough" left turns are kept; for example, any cluster with less than five (5) left-turn tuples are discarded owing to the insufficient number of traces. This clustering method is summarized as follows:

---

Algorithm 2 Cluster Left Turn Traces

Input:
    C = DBSCAN(L)
    for each cluster in C do
        if Number of left-turn instances in this cluster is less than 5 then
            /*Discard this cluster*/
        else
            c = FindCentroid (centroids of left-turn tuples in this cluster)
            Aggregate gyro, acc, and loc of each left-turn tuple into
            Gyro,
            Acc, and Loc,
respectively
            The data tuple of this left-turn hotspot is {c,Gyro, Acc, Loc}.
        End if
end for

---

Data for Each Cluster is Designated as a Left-Turn Hotspot
    Each of the thus-constructed left-turn hotspot can be represented by a data tuple x:

$$x_i = \{c_i, Gyro_i, Acc_i, Loc_i\}$$

$$X = \{x_i \ldots, x_i \ldots x_N\} \quad (2)$$

where i∈{1, ..., N}, N is the number of left-turn clusters. Gyro, Acc, Loc denote the thus-aggregated gyroscope, accelerometer, and location traces, respectively. X is the list of left-turn hotspot tuples.

Figure 9:
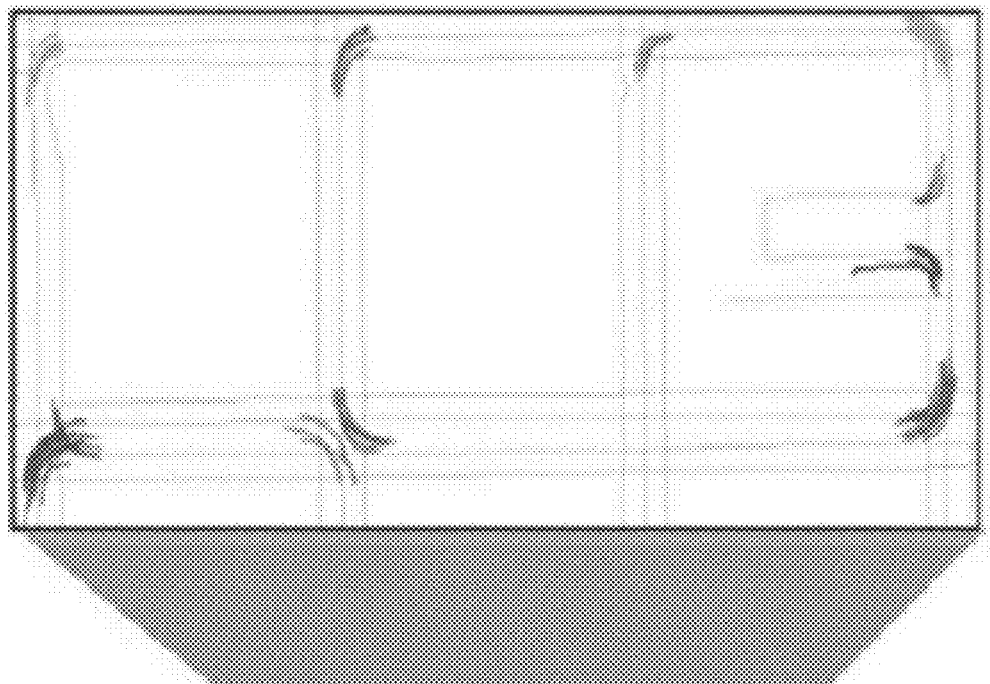
FIG. 9 illustrates the clustering results of a DBSCAN method.
Figure 9:
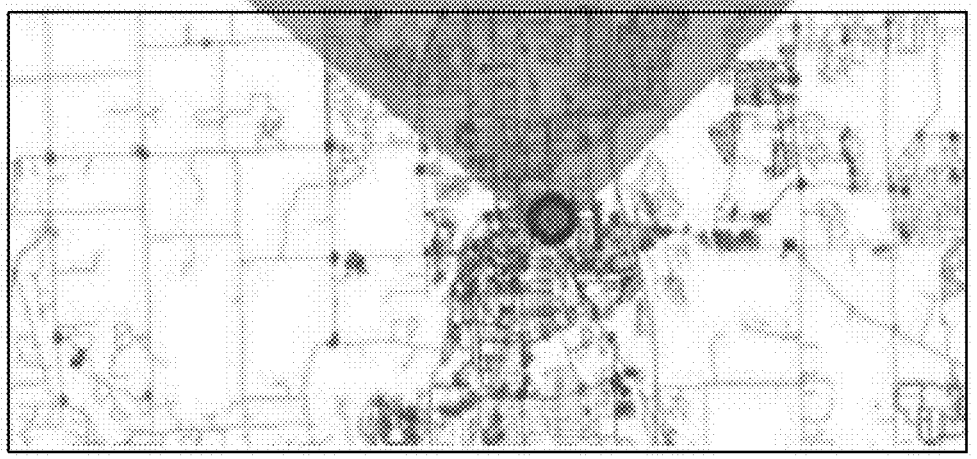

FIG. 9 shows part of a clustering result. The location traces are interpolated to show the trajectory of a left-turning car. In the zoom-in view, one intersection is not covered due to lack of driving data, but the other intersections are clustered by DBSCAN. Thus, a dataset X of time-series traces at left-turn hotspots is constructed.

Next, a ground truth is assigned at 84 to each of the clusters. Due to the lack of aground truth for each hotspot's left-turn setting, the system will need to collect the ground truth from scratch. In the example embodiment, a human-in-the-loop method is used to collect this information efficiently. Specifically, an annotation task is outsourced to the crowd on Amazon Mechanical Turk (AMT) and Google StreetView—a large-scale image database that includes traffic scene information collected by mapping cars—is used as the accessible reference for the annotators to identify the left-turn protection setting of each hotspot.

An easy-to-follow annotation process is essential to minimize the participants' confusion for good quality of annotation. To meet this requirement, one can design an interactive labeling/annotation webpage as the participants' working platform. Described below is how to annotate each left-turn hotspot on this webpage. Before starting the annotation, each participant will be asked to read our instruction carefully to understand the annotation process. Next, a backend system (a php script running on the server for hosting the webpage) will randomly pick a hotspot x from X and then display the corresponding Google StreetView based on the centroid of x. The annotator then needs to inspect the StreetView (i.e., by zooming in/out and changing the viewing angle) to get a clear view of the left-turn protection setting. The annotator will then be asked to choose one of the six options in the table shown in FIG. 10. Option 1 represents the protected left-turn signal; options 2-5 represent unprotected left turns; option 6 signifies none of the five aforementioned options according to the participant's perception/judgement, e.g., parking lots and/or road segments without any StreetView image. Finally, the backend system will record the annotator's input, and a new hotspot will be displayed on the webpage.

After publishing the annotation task on AMT, 231 annotators were recruited and asked to independently annotate/label 30 randomly-selected hotspots from X. Each annotator spent an average of 26.5 minutes to complete the task, which is reasonable for a new annotator to understand and annotate hotspots. Although crowdsourcing the collection of ground truths via AMT can significantly speed up the annotation, erroneous annotations are inevitable since the participants are not domain experts and may have different levels of perception.

Quality of the collected annotations can be enhanced as follows. First, one can ensure the annotators' competence by only recruiting "master" workers—elite workers who have demonstrated superior performance in their previous tasks and have been acknowledged by the corresponding requesters.

Second, a thorough and clear understanding of the annotation task can improve the participant's performance. To meet this goal, we only recruited drivers who reside in the U.S., since the driving data is collected from a US metropolitan city. Easy-to-follow instructions help the annotators understand different left-turn protection mechanisms and the annotation process.

Third, annotated data need to be filtered and refined for accuracy. To do so, one can ensure that each left-turn hotspot received multiple annotations from the participants. Specifically, any left-turn hotspot with less than three annotations are discarded. Then, for each remaining hotspot, we apply simple majority voting to determine its annotation. That is, we select the annotation with the largest number of repetitions. Note that a similar criterion is also commonly used in other large-scale ground truth collections, e.g., ImageNet and DeepDrive.

Figure 11:
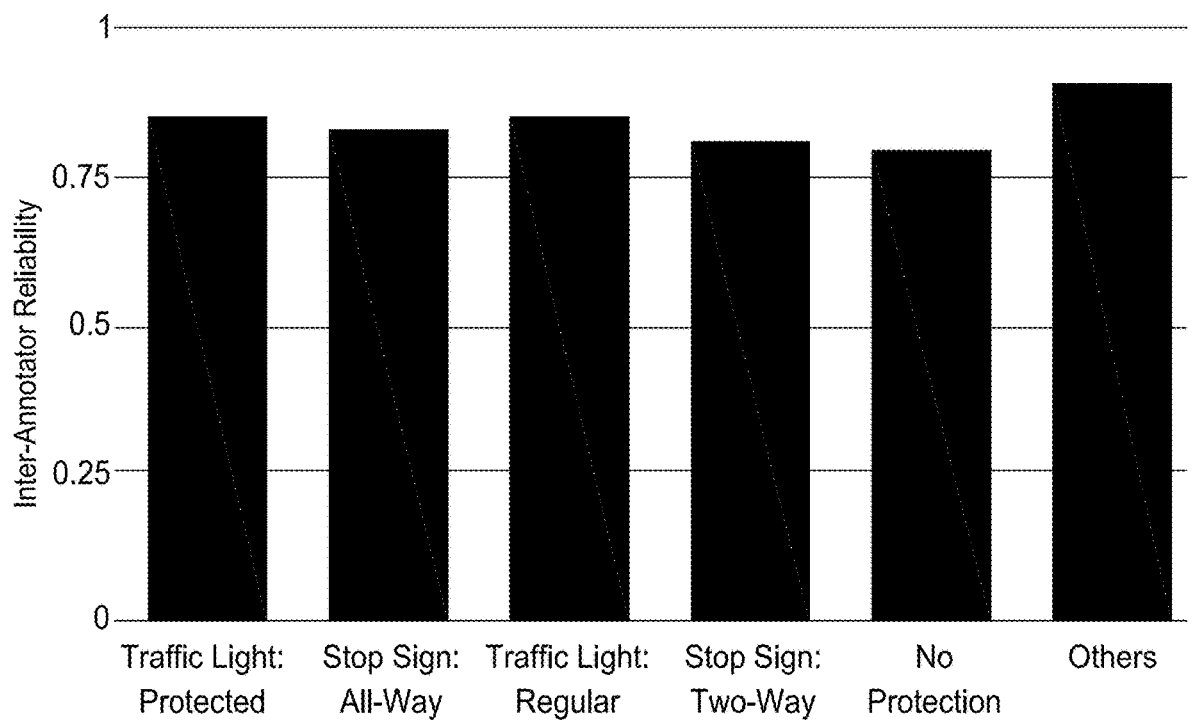
FIG. 11 is a graph showing the reliability for different types of left-turn protection.

For demonstration purposes, 1,000 hotspots were randomly selected from X and 6,016 annotations were collected—each hotspot has an average of 5.47 annotations. The quality of the dataset was assessed by inspecting the inter-annotator reliability of each left-turn protection setting, which measures the consistency among different annotators. It is a commonly used evaluation metric for assessing the quality of annotations collected from the crowd. As shown in FIG. 11, the inter-annotator reliability of each category is around 85%.

Moreover, the annotation result can also help one to understand the performance of left-turn hotspot extraction. Since false detections of a hotspot may be due to cars' swerving in open areas (e.g., parking lots), one can use the annotators' feedback on each hotspot to inspect if the hotspot is indeed a road segment that can facilitate left turns. According to the aggregated annotation results, 96.5% (965 out of 1,000) of the annotated hotspots are road segments that can be categorized into one of the five scenarios. Thus, left-turn hotspot extractions are shown to be able to accurately identify road segments that can facilitate left turns.

Figure 10:
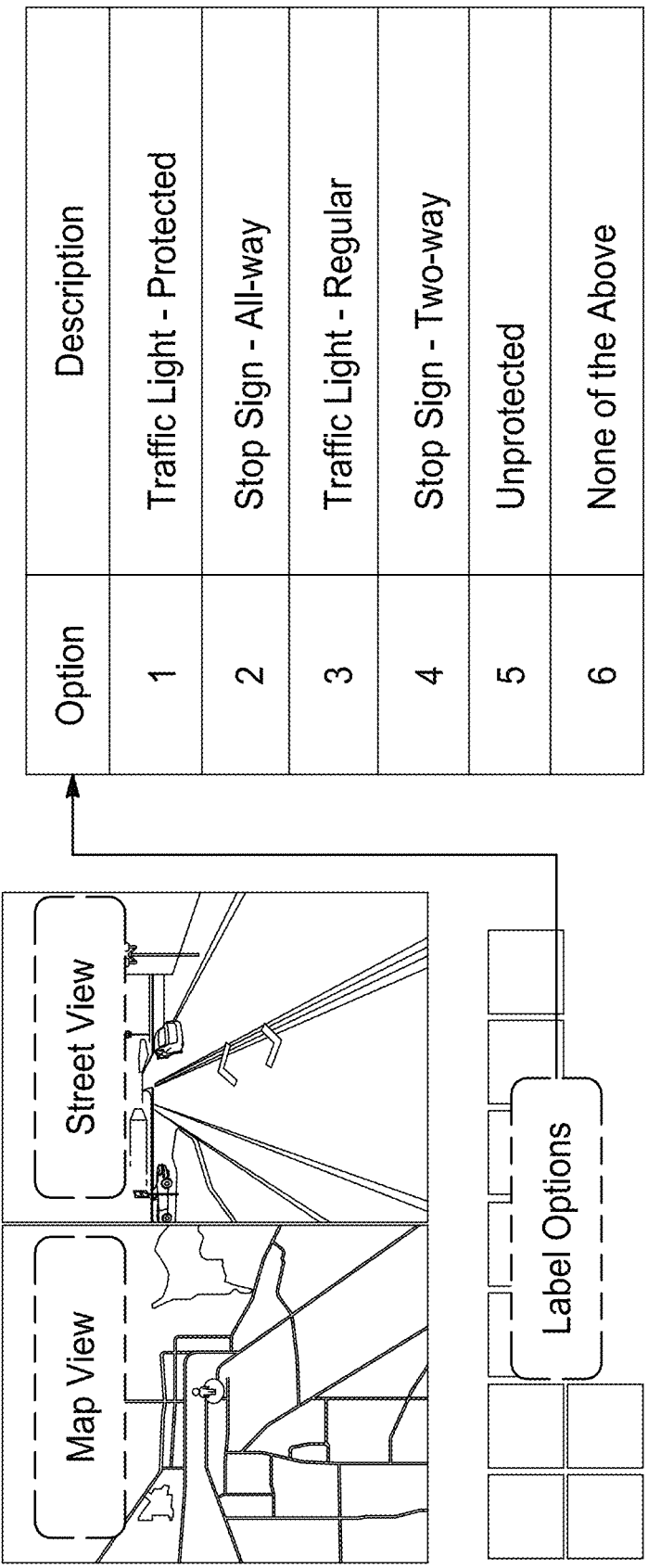
FIG. 10 is an example user interface for implementing online annotation.

Finally, a dataset is constructed using the annotated hotspots. Specifically, for hotspot i, denote its ground truth as $y_i$ if it has an annotation that passed our quality control test. Thus, one can have $$X = \{x_1, \ldots, x_i, \ldots, x_{N^1}\}$$

$$Y = \{y_1, \ldots, y_i, \ldots, y_{N^1}\} \quad (3)$$

where $y \in \{1, 2, 3, 4, 5\}$ as shown in FIG. 10; $i \in \{1, \ldots, N^1\}$, $N^1$ is the number of valid hotspots with valid annotations. In the current dataset, $N^1 = 965$. Note that by associating X with Y, one can have (x, y) pairs, which can be applied in supervised machine learning.

Classification of protected/unprotected left turns based on mobile sensing data at hotspots (X) can be cast as a supervised learning problem for binary classification of time-series data. With continued reference to FIG. 8, a classifier is trained at 85 with the feature vectors in the one or more clusters using supervised learning. In an example embodiment, one can modify Y to form a binary classification task: label 1 is categorized as a protected left turn while labels 2-5 are categorized as unprotected left turns. That is, $y_i = \{\text{Protected, Unprotected}\}$, $i \in \{1, \ldots, N^1\}$, $N^1 = 965$. As a result, there are 206 protected and 759 unprotected hotspots. The supervised machine learning problem can be formally state as follows. Given $N^1$ pairs of data of the form $\{(x_1, y_1), \ldots, (x_{n^1}, y_{n^1})\}$ the objective is to learn a model $X \rightarrow Y$, where y is an annotation, x is the measurement represented as a tuple of several time-series traces.

Figure 12:
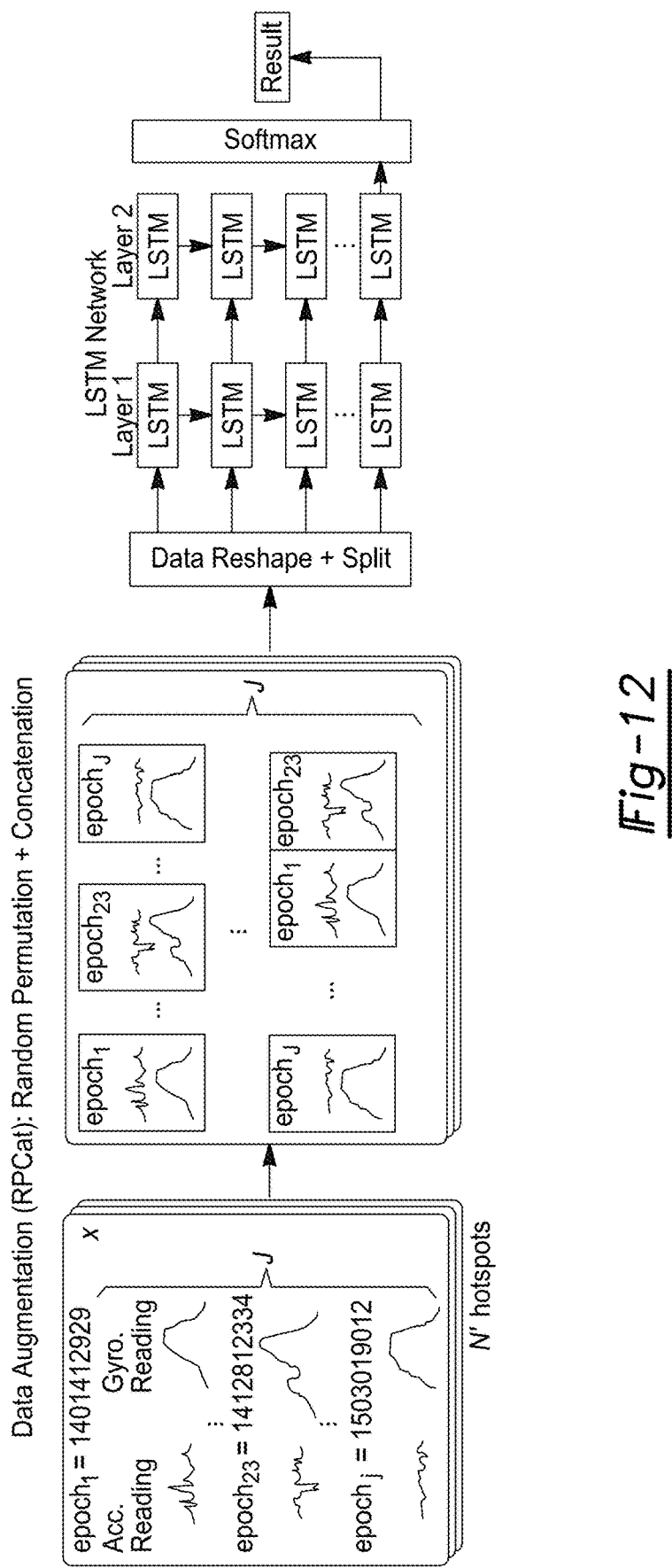
FIG. 12 is a diagram depicting an example machine learning pipeline for classifying left turns.

The key challenge in this learning task is how to form the input data by using the observation tuples (shown in Eq. (2)). The input data formation is different from many existing time-series classification tasks, such as pattern matching and DeepSense—a recent light-weighted deep learning framework which is optimized for running on mobile devices. Specifically, in the legacy time-series classification, each observation x is a single data trace (vector). For example, to train a classifier for a GaitID task (identifying a user based on his/her gait traces), each observation in the training set is a 2-dimensional vector of IMU sensor readings. However, in the TurnsMap system, each observation is a tuple of data traces. As shown in Eq. (2), the data of each observation x is comprised of gyro and acc, which are sets of gyroscope and accelerometer data vectors of different lengths. Without such data formation, it is not possible to distinguish left-turn settings based on one time-series data vector. For example, the left side frame in FIG. 12 illustrates the accelerometer and gyroscope data traces collected from an unprotected left turn. Note that not all traces exhibit the interruption pattern, i.e., some of the collected time-series traces are as smooth as if they were collected from a protected left turn. Therefore, a machine learning pipeline needs to pre-process the time-series data tuple to form data that can be used as input for the machine learning algorithm.

To address these challenges, this disclosure proposes a deep learning pipeline that is comprised by a novel data augmentation process and a deep Recurrent Neural Network (RNN) based on Long-Short Term Memory (LSTM) cells. The goal of the data augmentation is to construct and expand the training dataset without undermining the underlying pattern. For this purpose, randomly permuted concatenation (RPCat) is applied to each hotspot data, i.e., X. As shown in the second frame on the left of FIG. 12, RPCat has two steps: (i) expand the set of observations by permuting the sequence within x; and (ii) concatenate the data traces of each permuted observation. This approach is inspired by in the area of natural language processing (NLP), where data snippets (e.g., phrases in NLP) are concatenated together to form an overview of the overall dataset.

RPCat is illustrated using an example shown in FIG. 12. Suppose a hotspot's data x is comprised of J gyroscope and J accelerometer traces (i.e., J is the number of the clustered left-turn maneuvers at this hotspot). The sequence of data traces in x is originally organized according to the timestamp (e.g., epoch time in the TurnsMap system) of the collected data. Note that different left turns at this hotspot are independent of each other. That is, $$P(T_1, \ldots, T_j, \ldots, T_J),\quad (4)$$

where $T_j$ is the $j^{th}$ left-turn event and $P(T_j)$ is the probability of $T_j$'s occurrence. Due to the independence of different left turns, the arrival sequence of these data traces should not affect the classification result.

RPCat reflects this insight and reconstructs x as shown in the second frame in FIG. 12. Specifically, RPCat firstly permutes the sequence of data traces in x and then concatenates the data. After each permutation, RPCat generates a new sequence of data traces. Finally, to unify the data size for machine learning, resize each trace to length FixLen. Repeat RPCat J times to obtain a J×FixLen×2 tensor for x. One can execute the above process for all $N^1$ hotspots. Finally, after reshaping and splitting the data based on batch size, transfer the data into the input tensor for the LSTM network.

The parameters of the current RPCat are set as follows. For repetition of permutation, this parameter is to balance the dataset. For example, unprotected hotspots constitute the majority of the current dataset due to their prevalence in the real world. To avoid an imbalanced dataset, if x is an unprotected hotspot, repeat the permutation J times, whereas for each protected hotspot, permute 2J times. This allows us to have a more balanced dataset, which is necessary for better performance in training the LSTM network. Do not repeat RPCat full permutation times because permutation of J unique elements (Perm(J, J)) can be very large, e.g., Perm(10, 10)=3, 628, 800. Such a large dataset would be imbalanced and can take prohibitive long time for training.

For length of data traces, the current implementation uses FixLen=800. It is importation to note that the permutation does not undermine the sequential pattern of the data for the system. The sequential pattern (e.g., interruptions) of left-turn data resides in each left-turn maneuver. Since the permutation only shuffles the order of left turns, it does not change the sequential pattern of each left-turn data.

Now, the remaining question is how to learn the pattern based on the augmented training data. IN the example embodiment, a deep RNN framework with LSTM cells is used to learn the underlying pattern(s) from the augmented data. As a specific type of RNN architecture, LSTM has proven advantages over other machine learning algorithms, such as SVM, random forest, convolutional neural network, etc., for classifying sequential data. However, the use of an RNN architecture is not limiting and other types of machine learning algorithms can be used within the broader aspects of this disclosure. Specifically, each LSTM cell uses a forget gate to adjust the extent of passing the state variable to the next unit—an important feature for capturing dependencies through time. Moreover, the forget gate design is shown to have a desirable effect on mitigating the vanishing gradient problem, a common limitation for the classical RNN architecture that may restrict the network from learning the pattern from sequential observations. Stacked LSTM is used since a deeper hierarchical structure enables the network to gain more accurate understanding of the intrinsic pattern by disseminating the learning task to each layer.

In one example, the hyper-parameter settings of the network are: 2 LSTM layers, 32 LSTM cells per layer, batch size of 300, and the training rate of 0.001. The tan h function is used for updating the cell and hidden state, whereas the sigmoid function is used for the gates in LSTM cells. To mitigate overfitting, a 0.5 dropout rate is applied in each LSTM layer. The Adam optimizer is used for iteratively updating network weights. Finally, the network feeds the thus-learnt feature vector (1×32) into a softmax layer for generating the classification result.

Figure 13:
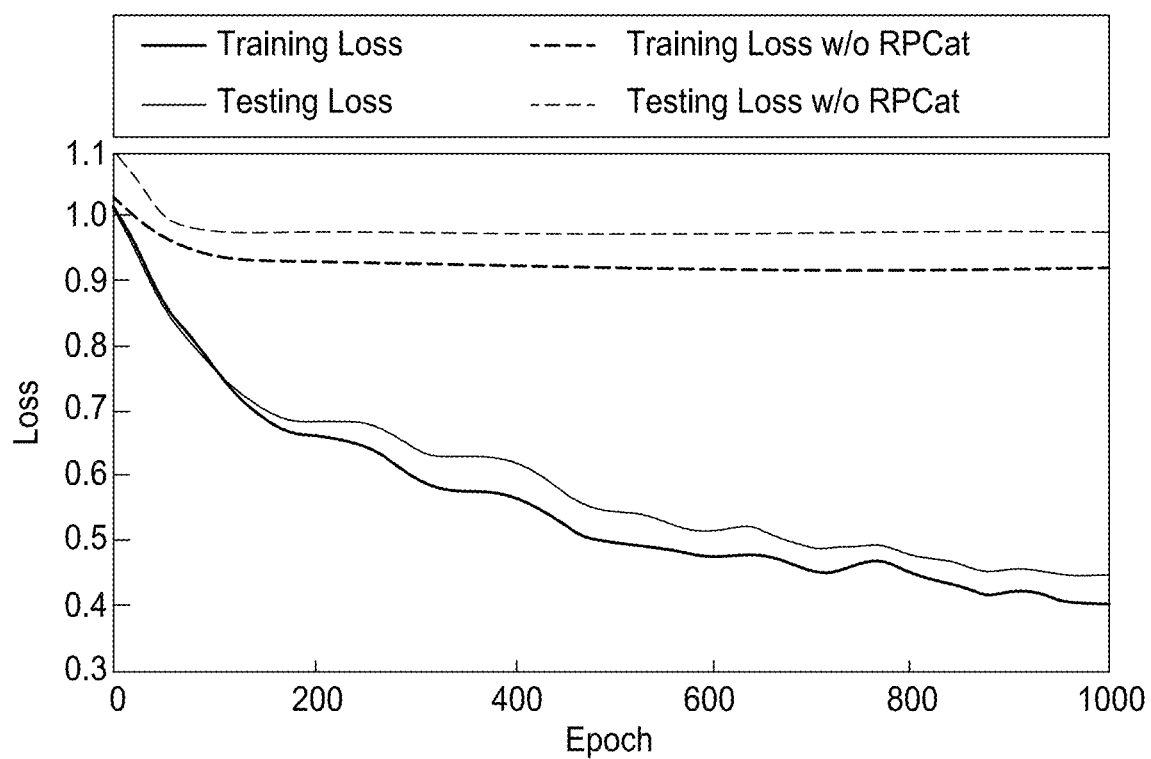
FIG. 13 is a graph showing the efficacy of randomly permuted concatenations on training with LSTM.

Next, the efficacy of a RPCat+deep LSTM pipeline was tested by evaluating the training loss. To obtain the test data, one can randomly select 20% of hotspots from X and then apply RPCat to build an augmented testing set. For testing, a learning pipeline was implemented with TensorFlow on a lab server equipped with one Titan Xp GPU. FIG. 13 shows the efficacy of RPCat and also the training and testing loss (training/testing loss is the penalty of misclassification of training/testing set) by using our learning pipeline. Without applying RPCat, both training and testing losses converged to high values, indicating underfitting—the LSTM network does not have enough data for learning the underlying pattern. With RPCat, despite the fluctuation caused by the convergence feature of Adam optimizer, both training and testing losses decrease with the increasing number of epoch (in neural network epoch, one epoch means the number of times the entire dataset is processed by the algorithm). Specifically, training and testing losses are stabilized at 0.4 and 0.45, respectively, after about 900 epochs. An evaluation of the machine learning pipeline is described below.

Figure 14:
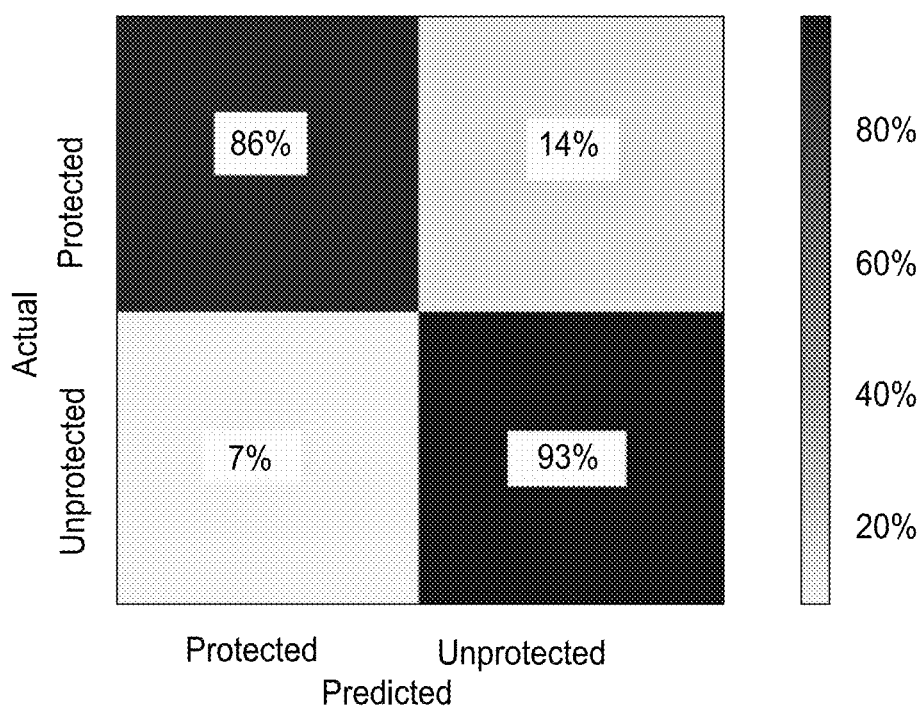
FIG. 14 is a normalized confusion matrix for analyzing the TurnsMap system performance.
Figures 15, 16:
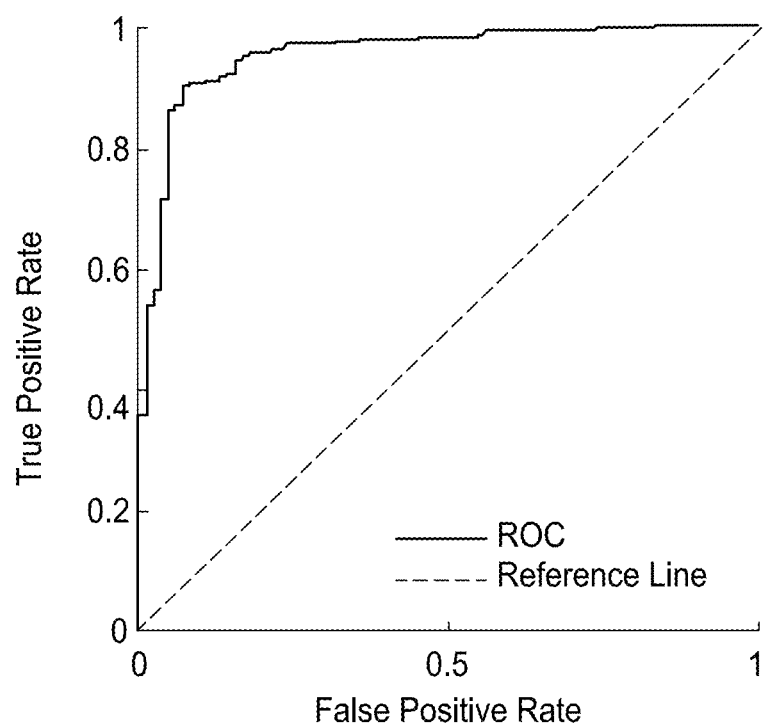
FIG. 15 is a chart showing the performance metrics of the LSTM-based machine learning pipeline.
FIG. 16 is a graph showing an ROC curve.

The machine learning pipeline can be evaluated using cross-validated performance metrics. FIG. 14 shows a confusion matrix where each row represents the actual class and each column represents the predicted class. FIG. 15 shows the precision, recall and F-1 score, where precision represents the ratio of true positive detections to the total positive detections, and recall represents the classifier's sensitivity with the ratio of true positive detections to the total actual positive observations. Accordingly, the classifier can identify different left-turn settings with high performance. Note that the number of instances of unprotected settings takes a large portion in the dataset due to its popularity in real-world, the classifier is not biased as evidenced by the performance metrics shown in FIG. 15. This shows the model trained on the augmented (and thus balanced) dataset is not biased and the LSTM framework successfully learns the feature(s) for differentiating left-turn protection schemes.

The TurnsMap system errs on the safe side of misclassifications to mitigate the impact of erroneous classifications. Specifically, it has a lower rate of misclassifying unprotected left turns as protected ones than that of classifying protected left turns as unprotected ones. This means that while identifying protected left turns with good accuracy, the system achieves better performance in identifying the unprotected left turns.

The performance of the TurnsMap system is essential for many applications, such as finding the safest left turns for novice drivers and route planning for self-driving cars.

Next, the classification performance is examined based on the unbalanced dataset. To evaluate the classifier's performance while varying the threshold (i.e., cut-off probability), test the performance and report the Receiver Operator Characteristic (ROC). Then, to evaluate whether performance of protected left turns detection is not dwarfed due to the imbalance of the current dataset, the Precision-Recall (PR) curve is reported to examine if precision captures the number of false positives.

Figure 17:
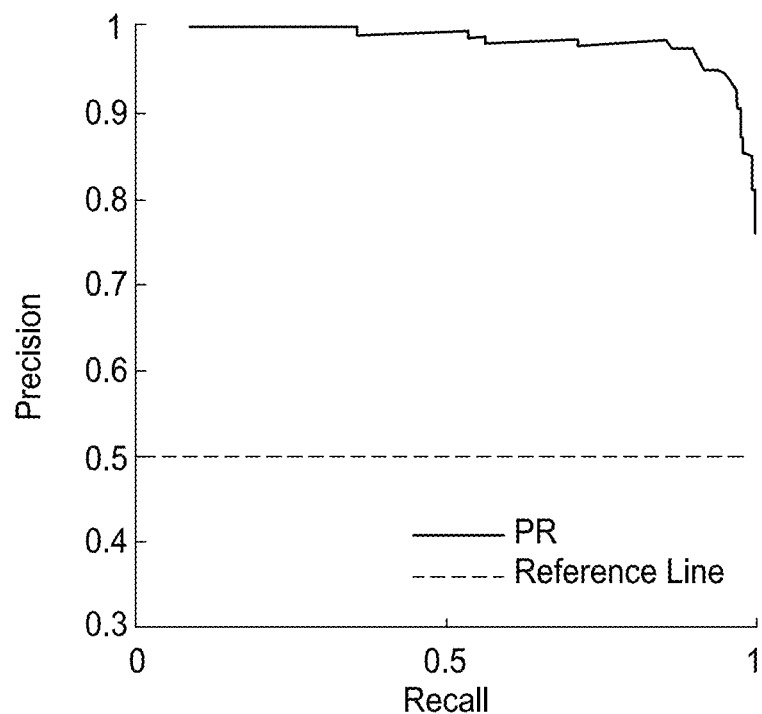
FIG. 17 is a graph showing a precision-recall curve.

Referring to FIGS. 16 and 17, both the ROC and PR curves show the efficacy of the classifier. Specifically, both curves have significantly better performance than their corresponding reference lines (i.e., random guess). Moreover, the area under curve (AUC) for ROC and PR curves is 0.954 and 0.926, respectively.

Figure 18:
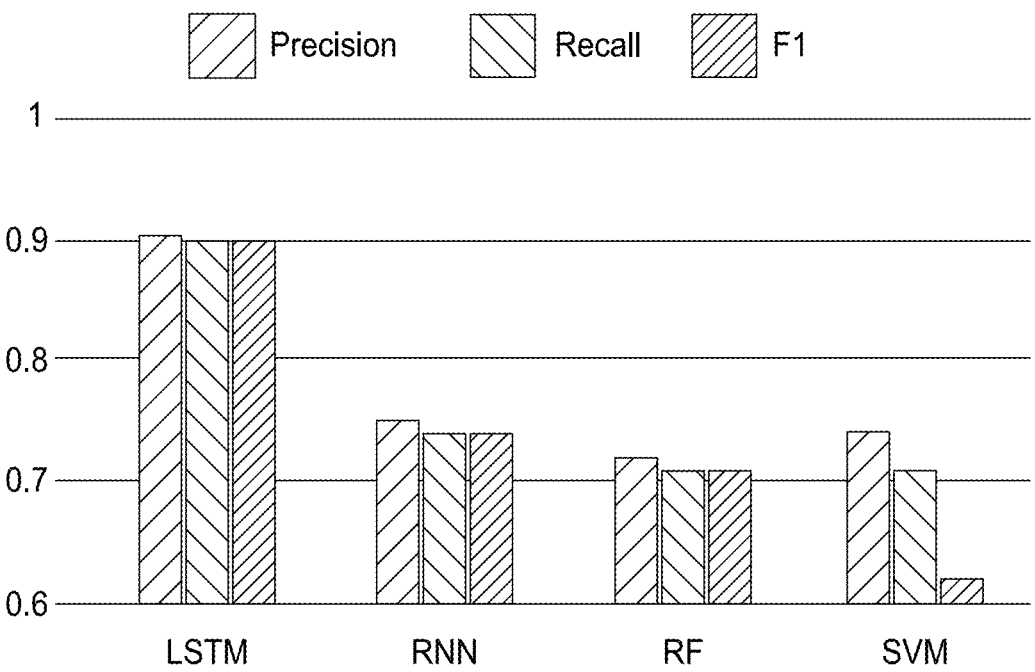
FIG. 18 is a graph showing a comparison between LSTM and other machine learning algorithms.

The proposed model's performance is compared with the models trained by other learning algorithms based on the augmented dataset, and the averaged performance metrics are plotted in FIG. 18, where a standard RNN, which is known to have good performance for sequential data, was tested. One of its key differences from LSTM is that the standard RNN cell lacks gates (e.g., forget gate) for learning the sequential dependencies that may have varying (e.g., short- or long-term) timespans. Also, the proposed model is compared with kernelized support vector machine (SVM), and random forest (RF). Specifically, the RNN uses the same hyper-parameter setting as the LSTM network. 200 decision trees were used for the RF algorithm. Note that the same training data setting was used for testing different algorithms. That is, the performance of RF and SVM with feature vector optimization is not the focus of this disclosure.

For the TurnsMap system, LSTM outperforms the others in all metrics considered. The advantages of LSTM over others is its capability of capturing dependencies through time. For example, RNN cells are susceptible to the vanishing gradient decent problem, making it very hard to capture the dependencies in time-series data. SVM has a low average F-1 score, because it misclassified many unprotected hotspots as protected ones while showing good performance in detecting protected hotspots.

Since left-turn enforcement is critical for driving safety, the TurnsMap system has potential for use in various app scenarios, such as navigation systems for both human- and self-driving cars, and reporting unprotected left-turn hotspots to the local transportation department.

In existing navigation systems (e.g., Google map), one of the key limitations is the lack of safety assessment of different routes. In fact, route/trip planning selects the route by minimizing the estimated time of arrival (ETA). As the result, the navigation system may generate a route with many risky unprotected left turns.

One of the TurnsMap system's exemplary application is augmenting existing navigation app with left turn setting information at intersections. That is, with the left-turn information discovered by the TurnsMap system, the system can provide this information with the collaborating navigation app to plan a route that also considers left-turn safety at intersections—which is not yet achieved functionality by using state-of-the-art approaches. Specifically, users of a navigation app can enable unprotected left turn avoidance in the setting of the app. Thus, the app can suggest an alternative route which has safer turning maneuvers (e.g., right turns).

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for classifying left turns of a vehicle, comprising:
    receiving, by a processor of a mobile device, a sensor signal from a sensor residing in the mobile device while the vehicle is moving, where the signal is indicative of angular speed of the vehicle
    constructing, by the processor, a feature vector from data received from the sensor;
    training, by the processor, a classifier in part based on the feature vector, where the classifier outputs a probability that a left turn made by the vehicle is a protected left turn;
    identifying, by the processor, one or more bumps in the sensor signal; and
    classifying, by the processor, a left turn made by the vehicle as being a protected left turn based on number of bumps identified in the sensor signal, where the protected left turn has a traffic indicia which causes a time period assigned exclusively to making a left turn.

2. The method of claim 1 further comprises classifying a left turn made by the vehicle as being a protected left turn in response to identifying one bump in the sensor signal, classifying a left turn made by the vehicle as being an unprotected left turn in response to identifying two bumps in the sensor signal.

3. The method of claim 1 further comprises
    detecting, by the processor, a left turn made by the vehicle using signals from one or more sensors residing in the mobile device; and
    identifying the one or more bumps in the signal in response to detecting a left turn of the vehicle.

4. The method of claim 1 further comprises:
    converting, by the processor, the sensor signal from a coordinate system associated with the mobile phone to a geographic coordinate system, where the sensor signal is report by the sensor relative to the coordinate system associated with the mobile phone; and
    deriving, by the processor, an angular speed signal from the converted sensor signal, where the angular speed signal is indicative of angular speed of the vehicle about a vertical axis of the geographic coordinate system.

5. The method of claim 1 further comprises
    receiving, by the processor, geolocation of the mobile device;
    associating, by the processor, geolocation with data points of the sensor signal, where the sensor signal is expressed as a time series; and
    determining, by the processor, two bumps in the sensor signal to be part of the same left turn based on proximity of geolocation of the two bumps to each other.

6. The method of claim 5 further comprises receiving geolocation of the mobile device as readings of a global positioning system (GPS) residing in the mobile device.

7. The method of claim 1 further comprises measuring the angular speed of the vehicle using a gyroscope residing in the mobile device.

8. The method of claim 1 wherein the classifier is further defined as a neural network.

9. A method for classifying left turns made by a vehicle, comprising:
    receiving, by a processor, a plurality of feature vectors, where each feature vector is indicative of a left turn made by a vehicle and each feature vector includes geolocation of the vehicle during the left turn and time series data for the angular speed of the vehicle during the left turn;
    spatially clustering, by the processor, the plurality of feature vectors based on geolocation to form one or more clusters of feature vectors;
    assigning, by the processor, a ground truth to the one or more clusters; and
    training, by the processor, a classifier with feature vectors in the one or more clusters using supervised learning, where the classifier outputs a probability that a left turn made by a vehicle is a protected left turn and a protected left turn has traffic indicia which creates a time period assigned exclusively to making a left turn.

10. The method of claim 9 further comprises
    collecting sensor data from one or more sensors residing in a mobile device while a vehicle is making a left turn;
    constructing a feature vector from the sensor data associated with each left turn; and
    uploading the feature vectors from the mobile device to a server.

11. The method of claim 9 wherein each feature vector further includes time series data from an accelerometer in the vehicle during the left turn.

12. The method of claim 9 further comprises, for each cluster, concatenating time series data from the feature vectors belong to a given cluster to form training data for the classifier, and randomly permutating sequence of time series data from the feature vectors belong to the given cluster to form additional training data.

13. The method of claim 9 further comprises spatially clustering the plurality of feature vectors using a density-based spatial clustering of applications with noise method.

14. The method of claim 9 wherein the classifier is further defined as a recurrent neural network.

15. The method of claim 9 further comprises
receiving a set of feature vectors indicative of a left turn made by a vehicle at a particular geolocation; and
classifying the left turn as one of a protected left turn or an unprotected left turn using the trained classifier.

16. The method of claim 15 further comprises selecting a route for a vehicle based in part on the classification of the left turn at the particular geolocation.

17. The method of claim 1 further comprises updating a database with an indicator that the left turn made by the vehicle is a protected left turn.

* * * * *